United States Patent
Fisher et al.

(10) Patent No.: US 8,991,591 B2
(45) Date of Patent: Mar. 31, 2015

(54) SEPARATOR SYSTEM AND METHOD FOR SEPARATING GROUPS OF PRODUCT FOR SEPARATE PROCESSING

(75) Inventors: Joseph M. Fisher, Cheektowaga, NY (US); Joseph A. Wukovits, Lancaster, NY (US); John D. Sardina, Hamburg, NY (US); Timothy J. Green, North Tonawanda, NY (US); Eric K. Spina, Eden, NY (US); Kerry Quinn, Palatine, IL (US)

(73) Assignee: Illinois Tool Works Inc., Glenview, IL (US)

( * ) Notice: Subject to any disclaimer, the term of this patent is extended or adjusted under 35 U.S.C. 154(b) by 199 days.

(21) Appl. No.: 13/336,336

(22) Filed: Dec. 23, 2011

(65) Prior Publication Data
US 2013/0161159 A1 Jun. 27, 2013

(51) Int. Cl.
*B65G 47/00* (2006.01)
*B65G 47/29* (2006.01)

(52) U.S. Cl.
CPC ....................................... *B65G 47/29* (2013.01)
USPC ...................................... 198/617; 198/459.6

(58) Field of Classification Search
USPC ........ 198/370.07, 418.7, 463.4, 419.1, 418.8, 198/368, 459.1, 459.6
See application file for complete search history.

(56) References Cited

U.S. PATENT DOCUMENTS

| | | | | |
|---|---|---|---|---|
| 3,201,912 | A * | 8/1965 | Wozniak | 53/495 |
| 4,946,025 | A * | 8/1990 | Murphy | 198/459.1 |
| 5,135,102 | A * | 8/1992 | Sjogren et al. | 198/468.6 |
| 7,007,791 | B2 * | 3/2006 | Stingel et al. | 198/368 |
| 7,431,141 | B2 * | 10/2008 | Nadeau et al. | 198/459.6 |
| 7,815,034 | B2 * | 10/2010 | Fleck et al. | 198/437 |
| 8,061,507 | B2 * | 11/2011 | Menozzi et al. | 198/468.11 |

* cited by examiner

*Primary Examiner* — William R Harp
(74) *Attorney, Agent, or Firm* — The Small Patent Law Group LLC; Christopher R. Carroll

(57) ABSTRACT

A separator system includes a conveyance assembly and one or more blocking components. The conveyance assembly moves a leading group of product and a trailing group of product along a feed direction toward a packaging system to separately package the leading group of product into a first container and the trailing group of product into a second container. The one or more blocking components are disposed upstream of the packaging system along the feed direction. The one or more blocking components stop movement of the trailing group of product upstream of the packaging system along the feed direction while allowing the leading group of product to move toward the packaging system.

23 Claims, 12 Drawing Sheets

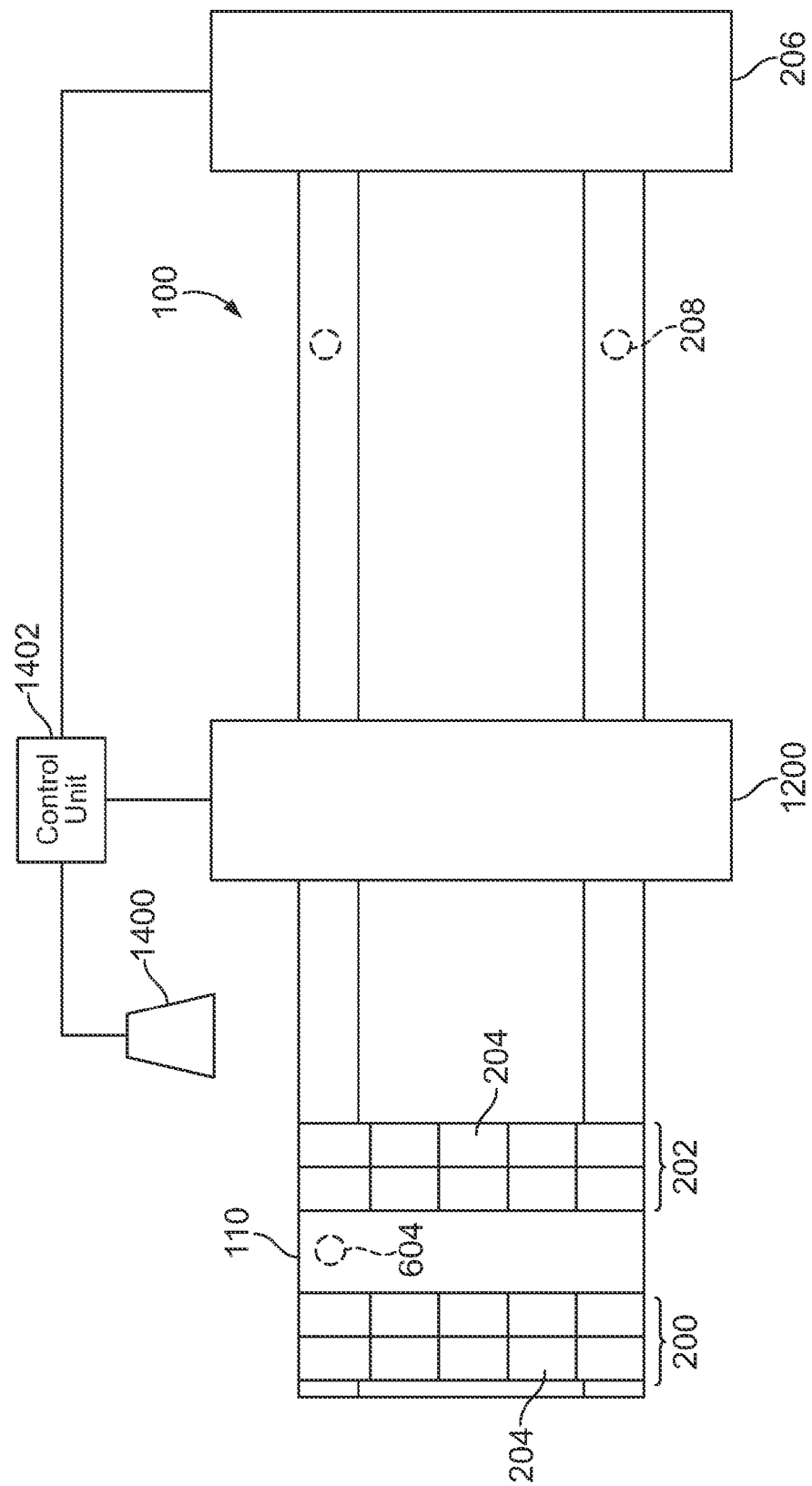

SEPARATOR SYSTEM AND METHOD FOR SEPARATING GROUPS OF PRODUCT FOR SEPARATE PROCESSING

BACKGROUND

A product and method relating to the batch manufacturing of products comprising multiple sequential operations is disclosed herein.

BRIEF DESCRIPTION

A product and method relating to the batch manufacturing of products comprising multiple sequential operations is disclosed herein, wherein a reduction of the delay between various batches is disclosed.

BRIEF DESCRIPTION OF THE DRAWINGS

The present inventive subject matter will be better understood from reading the following description of non-limiting embodiments, with reference to the attached drawings, wherein below:

FIG. 14 is a schematic diagram of another embodiment of a sensing assembly of the separator system shown in FIG. 1.

DETAILED DESCRIPTION

Figure 1:
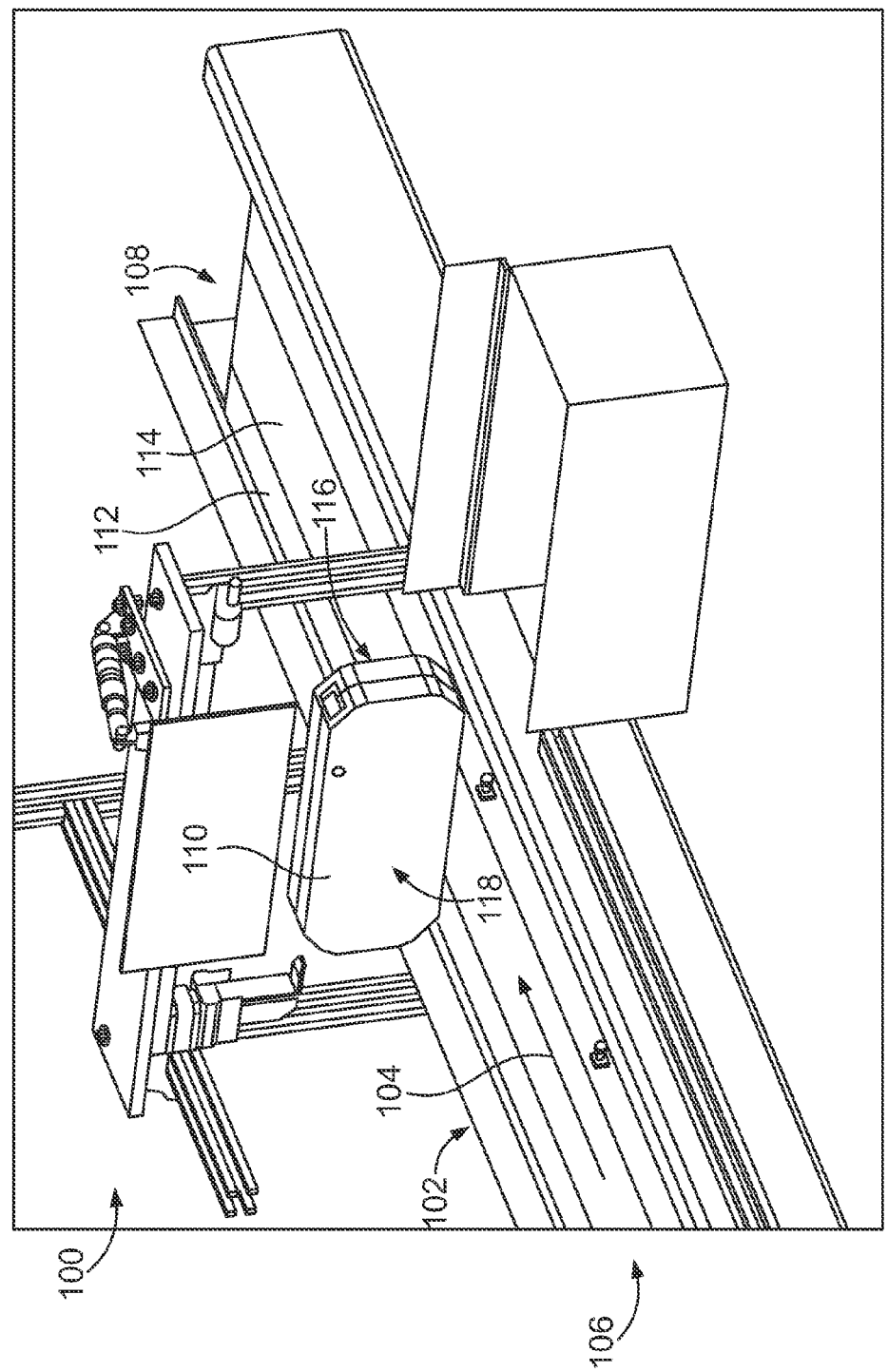
FIG. 1 is a perspective view of one embodiment of a separator system.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising," "comprises," "including," "includes," "having," or "has" an element or a plurality of elements having a particular property may include additional such elements not having that property.

One or more embodiments of the subject matter described herein provide systems and methods for separating groups of products from each other after labeling the product with a stamp, indicia, or other marking but prior to separately packaging the groups of product. The different groups may be separately packaged by placing each group into a different container, such as a different box. The stamp, indicia, or other marking is referred to herein as a label that is applied or printed onto the product. In one aspect, a separator system is provided that separates different batches of products (such as boxes of cigarettes) from each other after attaching stamps (such as tax stamps) to the products, but prior to packaging the different batches in boxes or other containers. The different groups of product can be fed along a conveyance mechanism from a labeling system toward a packing system that packages the groups of product into different boxes or other containers. A separation device is disposed between the different groups of product and is moved toward the separation system by the conveyance assembly. As the conveyance assembly moves the different groups of product segregated from each other by the separation device, the separator system engages the separation device so that a leading group of product on one side of the separation device is able to continue to be moved toward the packaging system.

A different, trailing group of product on the opposite side of the separation device is prevented from moving toward the packaging system by the engagement between the separation device and the conveyance assembly. When the leading group of product has been packaged by the packaging system and/or removed from the packaging system, the separator system may eject the separation device from the path of the trailing group of product. The ejected separation device may then no longer block movement of the trailing group of product such that the conveyance assembly moves the trailing group of product toward the packaging system. The trailing group of product is then packaged by the packaging system. One or more additional separator devices may be disposed between the trailing group of product and one or more additional groups of product so that the additional separator devices can block the additional groups of product while the trailing group of product is packaged, similar to as described above. For example, the systems and methods described herein can be used as a continuous process where several groups of product can be separated from each other and packaged in a continual manner. In one embodiment, a first leading group of product is packaged before a first trailing group of product. The first trailing group of product also may be a second leading group of product relative to another, second trailing group of product. The first leading group of product is packaged first, followed by the first trailing group/the second leading group of product, followed by the second trailing group and any other additional groups.

In one embodiment, the separation device can be placed between the different orders prior to the orders being placed into a processing system that processes the different groups of product. For example, the separation device can be positioned between the leading group of product and the trailing group of product before the groups are loaded into the labeling system. A sensing device (e.g., a sensor) can detect the presence of the separation device before the labeling system labels the separation device and direct the labeling system to not label the separation device. For example, an electromagnetic sensor can detect a magnetic or other marker or object connected or imbedded in the separation device, an optical sensor can optically detect the separation device, a radio frequency identification (RFID) transmitter can electromagnetically detect an RFID tag on or in the separation device, and the like, before the separation device is labeled by the labeling system. The labeling system may then label the leading group of product, skip labeling the separation device (and/or skip otherwise processing the separation device, such as by avoiding opening the separation device and/or closing the separation device as would otherwise be done to label the product), and then label the trailing group of product.

Figure 2:
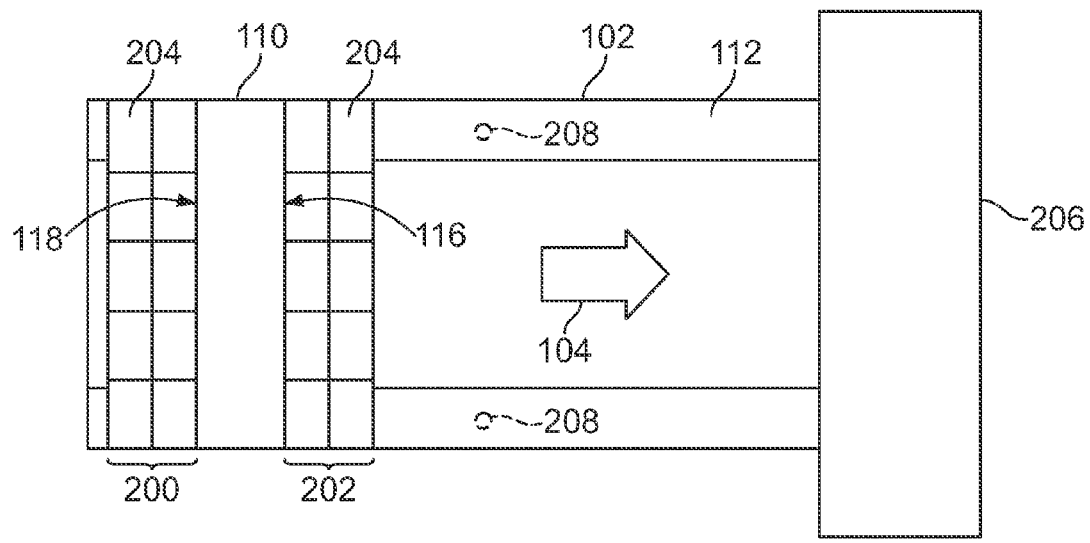
FIG. 2 is a schematic view of a separation device shown in FIG. 1 operating to separate different groups of product from each other in accordance with one embodiment.

FIG. 1 is a perspective view of one embodiment of a separator system 100. The separator system 100 is shown as being disposed above a conveyance assembly 102. The conveyance assembly 102 moves the groups of product along a feed direction 104 below the separator system 100. The conveyance assembly .102 moves the product from an entry end 106 of the conveyance assembly 102 to an exit end 108 of the conveyance assembly 102. The product may be loaded onto the conveyance assembly 102 at the entry end 106 and the groups of product may be loaded into a packaging system 206 (shown in FIG. 2) at the exit end 108. In the illustrated embodiment, the conveyance assembly 102 includes a substantially planar surface 112 with a conveyor 114 (e.g., a conveyor belt) disposed over the surface. The conveyor 114 may be coupled to a motor or other actuator that moves the conveyor 114 relative to the surface 112 in order to transport the product along the feed direction 104. Alternatively, one or more other mechanisms may be used to move the product along the feed direction 104. The conveyor 114 may continuously move relative to the surface 112.

A separation device 110 is disposed between the different groups of products that move below the separator system 100 by the conveyance assembly 102. The separation device 110 may be placed between the different groups of product when the product is loaded onto the conveyance assembly 102 at the entry end 106 of the conveyance assembly 102. The separation device 110 moves with the groups of product toward the separator system 100. Although not shown in FIG. 1, one or more blocking components 208 (shown in FIG. 2) may be coupled with and/or disposed near the conveyance assembly 102 such that the blocking components 208 engage the separation device 110 (or a trailing group of product, as described below) when the separation device 110 (or the trailing group of product) moves toward a processing system, such as toward a packaging system. The blocking components 208 contact the separation device 110 (or trailing group of product) so that the separation device 110 (or trailing group of product) is prevented from continued movement in the feed direction 104. The conveyor 114 of the conveyance assembly 102 may continue to move along the feed direction 104.

The continued movement of the conveyance assembly 102 with the separation device 110 prevented from moving by the blocking components 208 allows the group of products on a leading side 116 of the separation device 110 (e.g., a leading group of product) to continue moving toward a packaging system 206 (shown in FIG. 2) while the group of products on an opposite trailing side 118 of the separation device 110 (e.g., the trailing group of product) remains stationary. The leading side 116 of the separation device 110 includes the side of the separation device 110 that faces the exit end 108 of the conveyance assembly 102. The group of product on the leading side 116 of the separation device 110 is disposed between the separation device 110 and the exit end 108 of the conveyance assembly 102. The trailing side 118 of the separation device 110 includes the side of the separation device 110 that is opposite of the leading side 116 and that faces the entry end 106 of the conveyance assembly 102.

FIGS. 2 through 5 are schematic views of the separation device 110 operating to separate different groups 200, 202 of product 204 from each other in accordance with one embodiment. In the illustrated embodiment, the product 204 represents boxes of tobacco products arranged in cartons, such as boxes of cigarettes in cartons, Alternatively, the product 204 may include a different object or thing that is labeled by the labeling system and packaged by the packaging system 206. Each of the groups 200, 202 of product 204 may include one or more sets of the product 204, such as one or more cartons of cigarette boxes. The group 200 is referred to as the trailing group 200 because the group 200 is on the trailing side 118 of the separation device 110 relative to the feed direction 104 of the conveyance assembly 102. The group 202 of product 204 is referred to as the leading group 202 because group 202 is on the leading side 116 of the separation device 110 relative to the feed direction 104 of the conveyance assembly 102.

In operation, the groups 200, 202 of product 204 and the separation device 110 travel as a moving set in the feed direction 104 toward the packaging system 206 (schematically shown in FIGS. 2 through 5). When the separation device 110 approaches the blocking components 208 of the conveyance assembly 102, the blocking components 208 actuate to engage the separation device 110. The blocking components 208 are shown in dashed lines in FIG. 2 to represent the blocking components 208 in a retracted state. The blocking components 208 may be bodies, such as pins, blocks, or other shapes, that retract into the conveyance assembly 102 below the surface 112 of the conveyance assembly 102 and extend out of the conveyance assembly 102 above the surface 112. The blocking components 208 are shown in the conveyance assembly 102 on opposite sides of the conveyor 114. When retracted, the blocking components 208 allow the product 204 and separation device 110 to pass over the blocking components 208 toward the packaging system 206. The blocking components 208 remain retracted to allow the leading group 202 to pass over the blocking components 208, but actuate to extend out and engage the separation device 110.

Figure 3:
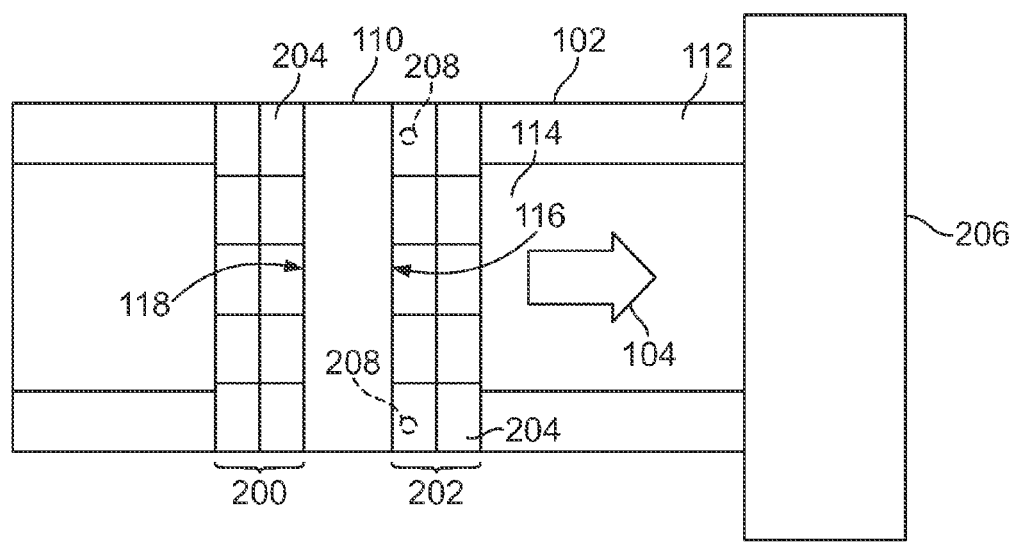
FIG. 3 is another schematic view of a separation device shown in FIG. 1 operating to separate different groups of product from each other in accordance with one embodiment.
Figure 4:
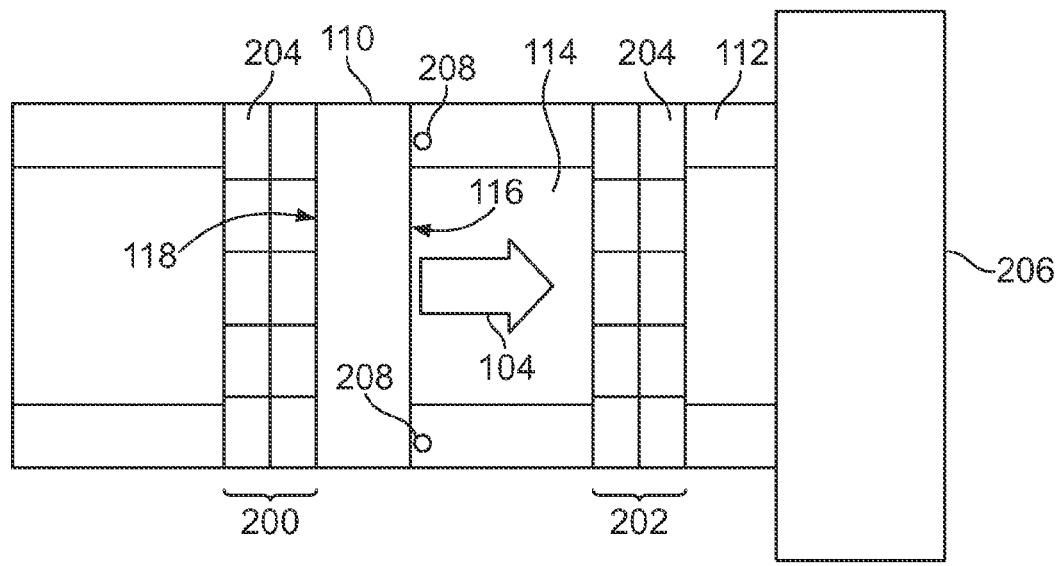
FIG. 4 is another schematic view of a separation device shown in FIG. 1 operating to separate different groups of product from each other in accordance with one embodiment.

FIGS. 3 and 4 illustrate one embodiment the blocking components 208 in an extended state to engage the separation device 110. When the leading group 202 of product 204 has passed or substantially passed the blocking components 208 of the conveyance assembly 102, the blocking components 208 may extend from the surface 112 of the conveyance assembly 102 to engage the separation device 110. By "passed or substantially passed," it is meant that the leading group 202 of product 204 has moved sufficiently far in the feed direction 104 that extending the blocking components 208 up from the surface 112 of the conveyance assembly 102 to engage the separation device 110 does not stop the leading group 202 of product 204 from continuing to move in the feed direction 104, For example, the blocking components 208 may extend and partially lift part of the leading group 202 of product 204 such that the leading group 202 of product 204 is not blocked from continued movement in the feed direction 104 and lowers back onto the conveyor 114 once the leading group 202 of product 204 has passed the blocking components 208. The blocking components 208 are shown in dashed lines in FIG. 3 even though the blocking components 208 are extend upward from the surface 112 of the conveyance assembly 102 because the extended blocking components 208 are disposed beneath the leading group 202 of product 204 in the illustrated embodiment.

Once the blocking components 208 have extended upward, the leading group 202 of product 204 continues to be moved toward the packaging system 206 while the blocking components 208 engage the leading side 116 of the separation device 110, as shown in FIG. 4. For example, the blocking components 208 are located upstream of the packaging system 206 along the feed direction 104 such that the blocking components 208 allow the leading group 202 to continue moving while movement of the trailing group 200 is stopped. The engagement between the blocking components 208 and the separation device 110 prevents the separation device 110 from continuing to move in the feed direction 104. This engagement also prevents the trailing group 200 of product 204 from moving in the feed direction 104 toward the packaging system 206. The conveyor 114 of the conveyance assembly 102 may move relative to and beneath the separation device 110 and the trailing group 200 of product 204 while the conveyor 114 moves (but does not move relative to) the leading group 202 of product 204. For example, the conveyor 114 may continue to move at a constant or approximately constant speed to move the groups 200, 202 of product 204 until the groups 200, 202 of product 204 are stopped from continued movement by a stationary separation device 110, the blocking components 208, the end of the conveyor 114, and the like. Alternatively, the separation device 110 may include one or more recesses (not shown) that are disposed within the thickness of the separation device 110 (e.g., between the leading side 116 and the trailing side 118) that accept the extended blocking components 208 when the separation device 110 is disposed over the blocking components 208. These recesses can accept the blocking components 208 to prevent further movement of the separation device 110 in the feed direction 104.

In another embodiment, instead of the blocking components 208 engaging the separation device 110, the blocking components 208 may directly engage the trailing group 200 of product 204. For example, the blocking components 208 may extend to engage a leading side of the trailing group 200 of product 204 (e.g., the side of the trailing group 200 that engages, abuts, or faces the trailing side 118 of the separation device 110). The engagement between the blocking components 208 and the trailing group 200 of product 204 blocks movement of the trailing group 200 of product 204 until the leading group 202 of product 204 is packaged (or almost finished packaging) by the packing system 206. The blocking components 208 may then retract to allow the trailing group 200 of product 204 to move toward the packaging system 206.

Alternatively, the blocking components 208 may be disposed outside of the path of travel of the groups 200, 202 of product 204, but still within the path of travel of the separation device 110, so that the blocking components 208 engage and stop movement of the separation device 110 while allowing the product 204 to continue moving. For example, the separation device 110 may be wider than the groups 200, 202 of product 204, in contrast to the same or similar widths of the separation device 110 and groups 200, 202 shown in FIGS. 2 through 5. The blocking components 208 may be stationary devices (e.g., static components that do not extend or retract) that are separated from each other by a distance that is wider than the width of the groups 200, 202 of product 204, but narrower than the width of the separation device 110. When the leading group 202 of product 204 approaches the blocking components 208, the leading group 202 may continue moving between the blocking components 208. When the separation device 110 moves toward the blocking components 208, the blocking components 208 may engage the separation device 110 to arrest further movement of the separation device 110 toward the packaging system 206. As described below, the separation device 110 may then be ejected from the path of travel of the trailing group 200 of product 204. The trailing group 200 of product 204 may then move between the stationary blocking components 208 toward the packaging system 206.

Figure 5:
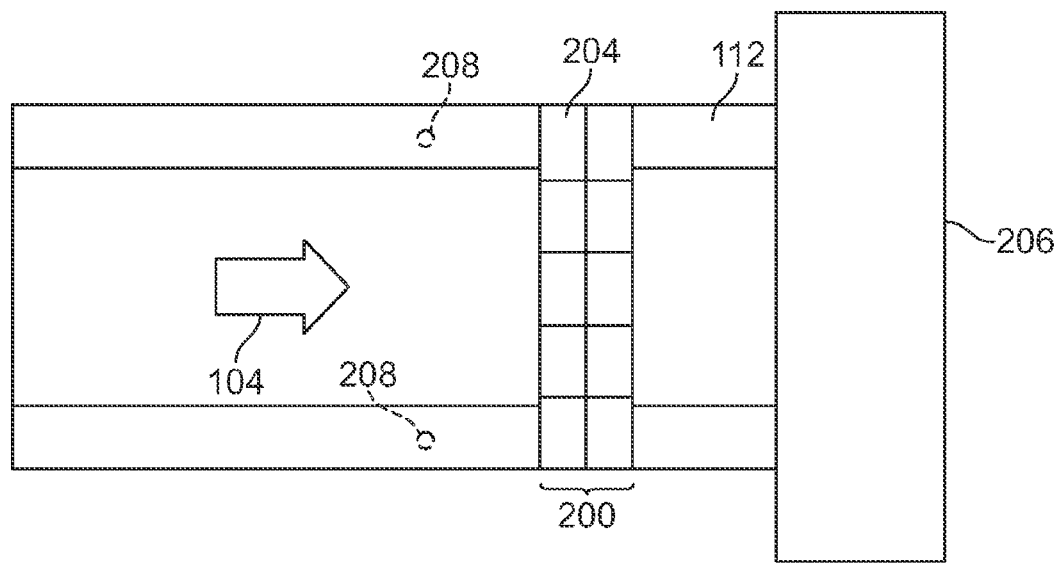
FIG. 5 is another schematic view of a separation device shown in FIG. 1 operating to separate different groups of product from each other in accordance with one embodiment.

FIG. 5 illustrates one embodiment of movement of the trailing group 200 of product 204 moving toward the packaging system 206 after the separation device 110 is removed. After the leading group 202 of product 204 has moved from the conveyance assembly 112 into the packaging system 206, the blocking components 208 may continue to prevent the conveyance of trailing group 200 toward packaging system 206 while the leading group 202 of product 204 is being processed by the packaging system 206. The conveyance assembly 112 may continue to move the conveyor 114 in the feed direction 104, with the separation device 110 and the trailing group 200 of product 204 held in place by the blocking components 208. Alternatively, the separation device 110 may be ejected from the path of travel of the trailing group 200 of product 204 in the feed direction 104 (as described below) so that the trailing group 200 is engaged by and prevented from continued movement toward the packaging system 206 by the blocking components 208. For example, after engaging the separation device 110, the separation device 110 may be removed from the conveyance assembly 112 so that the trailing group 200 of product 204 moves to and engages the extended blocking components 208. The processing of the leading group 202 of product 204 by the packaging system 206 may involve the placing of the product 204 in the leading group 202 into a container (such as a box) closing or sealing the container, and/or the removal of the container with the leading group 202 of product 204 from the packaging system 206. For example, the blocking components 208 may continue to hold the separation device 110 and/or the trailing group 200 of product 204 in place to prevent the trailing group 200 from moving toward the packaging system 206 until the leading group 202 of product 204 has passed through, or been purged from, the packaging system 206.

When the leading group 202 of product 204 has been purged from the packaging system 206, the separation device 110 can be removed in order to allow the trailing group 200 of product 204 to return to being moved toward the packaging system 206 by the conveyance assembly 112, as shown in FIG. 5. Alternatively, the separation device 110 may be removed before the leading group 202 of product 204 has been fully purged from the packaging system 206. For example, the separation device 110 may be removed when the leading group 202 of product 204 is only partially packaged, but not removed until a time that is sufficiently late to allow the leading group 202 of product 204 to be packaged before the trailing group 200 of product 204 is received into the packaging system 206. In the illustrated embodiment, the blocking components 208 may retract back into the conveyance assembly 112 to allow the trailing group 200 to pass. The trailing group 200 of product 204 may then travel to and be processed by the packaging system 206. As described above, additional separation devices 110 and groups 200, 202 of product 204 may follow the trailing group 200 of product 204 shown in FIG. 2 through 5. Each separation device 110 can allow a leading group 202 to be processed and purged from the packaging system 206 while the other groups 200 of product 204 are prevented from moving toward the packaging system 206. As each separation device 110 is removed, the next trailing group 200 of product 204 may return to moving toward the packaging system 206.

Figure 6:
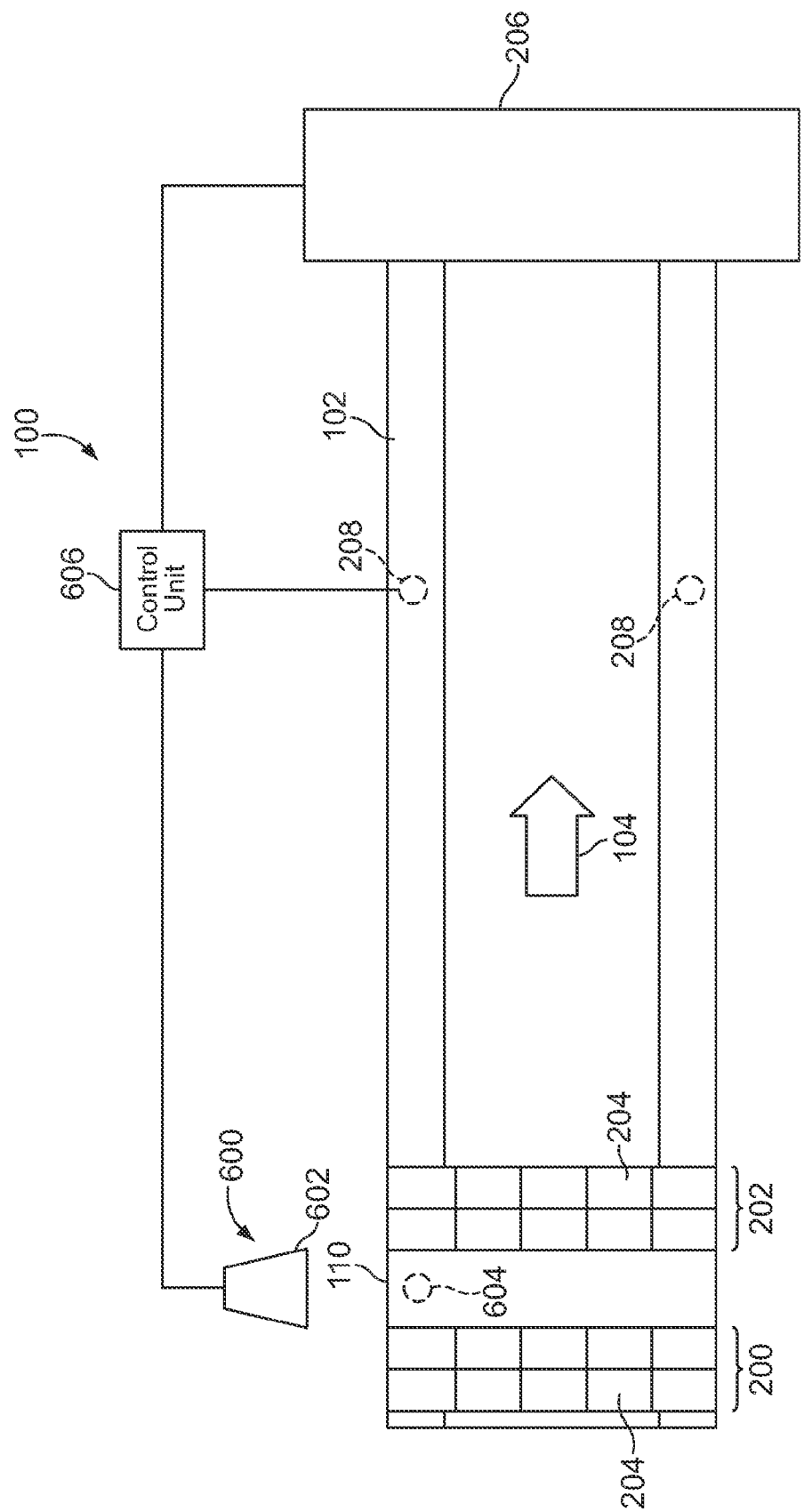
FIG. 6 is a schematic diagram of one embodiment of a sensing assembly of the separator system shown in FIG. 1.

FIG. 6 is a schematic diagram of one embodiment of a sensing assembly 600 of the separator system 100. The sensing assembly 600 may be provided in the separator system 100 to determine when the separation device 110 is approaching or will approach the blocking components 208 of the conveyance assembly 102. The sensing assembly 600 includes a sensor 602 that detects when the separation device 110 passes the sensor 602. In one embodiment, the separation device 110 includes a sensory target 604 that is detected by the sensor 602 as the separation device 110 is moved past the sensor 602 by the conveyance assembly 102. Alternatively, the sensor 602 may detect when one or more of the groups 200, 202 of product 204 move past the sensor 602. For example, the sensor 602 may sense when the leading group 202 of product 204 moves by the sensor 602 by detecting a sensory target 604 on the leading group 202 of product 204. Sensing the sensory target 604 on the leading group 202 of product 204 may be used in an embodiment where the separation device 110 is not used to separate the leading group 202 from the trailing group 200, For example, in an embodiment where the blocking components 208 actuate to directly engage the trailing group 200 of product 204 (as described above), the sensor 602 may be used to determine when the leading group 202 will move by the blocking components 208 and/or when the trailing group 200 will arrive at the blocking components 208 in order to actuate the blocking components 208 at a time that results in the movement of the trailing group 200 of product 204 being blocked while the leading group 202 of product 204 continues to move.

The sensor 602 can include one or more of a variety of systems, assemblies, devices, or components that detect the presence of the separation device 110 and/or one or more of the groups 200, 202 of product 204. As one example, the sensor 602 may include a Hall effect sensor that detects an external magnetic field generated by a magnet included in the sensory target 604 of the separation device 110 and/or one or more of the groups 200, 202 of product 204. Alternatively, the sensor 602 may include a transmitter, such as a radio frequency (RF) transmitter, that emits electromagnetic waves and the sensory target 604 may include a receiver, such as an RF identification (RFID) tag, that is detected by the sensor 602. In another embodiment, the sensor 602 may include a camera and the sensory target 604 may include one or more indicia on an exterior surface of the separation device 110 and/or one or more of the groups 200, 202 of product 204 that are visually identified by the sensor 602. The preceding examples are provided as only some of the sensor 602 and sensory target 604 combinations that may be used to determine when the separation device 110 and/or one or more of the groups 200, 202 of product 204 is approaching the blocking components 208. Other systems, assemblies, devices, or components may be used. Alternatively, the separation device 110 and/or one or more of the groups 200, 202 of product 204 may not include the sensory target 604. For example, the sensor 602 may be capable of detecting passage of the separation device 110 and/or one or more of the groups 200, 202 of product 204 by the sensor 602 without the sensory target 604 (such as by visually identifying the separation device 110 and/or one or more of the groups 200, 202 of product 204 with a camera).

When the separation device 110 and/or one or more of the groups 200, 202 of product 204 passes by the sensor 602, the sensor 602 may report detection of the separation device 110 and/or one or more of the groups 200, 202 of product 204 to a control unit 606 of the separator system 100. For example, the sensor 602 may generate an electric output signal that is communicated to the control unit 606 by one or more wired and/or wireless communication pathways. The control unit 606 can include one or more logic-based devices, such as a processor, controller, or other device that operates based on one or more sets of instructions that are stored on a tangible and computer-readable storage medium and/or hard-wired into the logic of the control unit 606. The control unit 606 receives the output signal from the sensor 602 and determines when the separation device 110 and/or the trailing group 200 of product 204 will reach the blocking components 208 of the conveyance assembly 102. In one embodiment, a distance along the feed direction 104 between the sensor 602 and the blocking components 208 and the speed at which the conveyance assembly 102 moves the separation device 110 and/or one or more of the groups 200, 202 of product 204 in the feed direction is known or monitored such that the control unit 606 can calculate when the separation device 110 and/or the trailing group 200 of product 204 will arrive at the blocking components 208.

The control unit 606 may then direct the blocking components 208 to extend from the conveyance assembly 102, as described above, to engage the separation device 110 or the trailing group 200 of product 204 when the separation device 110 or trailing group 200 of product 204 arrives at the blocking components 208. For example, the blocking components 208 may be coupled with actuators (such as pneumatic or electrically controlled actuators) that are controlled by the control unit 606 to extend or retract the blocking components 208. While the blocking components 208 are shown as extending and retracting in vertical directions (e.g., rising and lowering), alternatively, the blocking components 208 may extend and retract in horizontal or lateral directions, such as from opposing sides of the conveyor 114.

In one embodiment, the control unit 606 may interface with the packaging system 206 to determine when the leading group 200 of product 204 has been processed (e.g., purged) from the packaging system 206. For example, the packaging system 206 may communicate an output signal to the control unit 606 via a wired and/or wireless communication link that indicates when the product 204 in the leading group 200 has been packaged and/or removed from the packaging system 206. Alternatively, the packaging system 206 may communicate the output signal to notify the control unit 606 when the leading group 200 of product 204 will be purged but prior to the actual purging of the product 204. In another embodiment, an operator of the packaging system 206 may direct the packaging system 206 to generate the output signal when the leading group 202 of product 204 is purged. Based on the output signal, the control unit 606 may determine when to eject the separation device 110 from the conveyance assembly 102. For example, the control unit 606 may calculate when the separation device 110 can be removed from the conveyance assembly 102 such that the separation device 110 does not block movement of the trailing group 200 of product 204 from moving toward the packaging system 206 and the separation device 110 does not move toward the packaging system 206.

FIG. 14 is a schematic diagram of another embodiment of a sensing assembly 1400 of the separator system 100. The sensing assembly 1400 may be similar to the sensing assembly 600 (shown in FIG. 6). For example, the sensing assembly 1400 may detect the presence of the separation device 110. The sensing assembly 1400 may be used to detect when the separation device 110 is between the leading group 202 and trailing group 200 of product 204 before the groups 202, 204 and separation device 110 are processed by the labeling system 1200. For example, the sensing assembly 1400 may be positioned upstream of the labeling system 1200 along a direction of travel of the groups 200, 202 and the separation device 110, and/or within the labeling system 1200 so that the sensing assembly 1400 detects the presence of the separation device 110 before the labeling system 1200 attempts to process the separation device 110 similar to the groups 200, 202 of product 204. For example, the sensing assembly 1400 may sense the presence of the separation device 110 and prevent the labeling system 1200 from attempting to open the separation device 110, label the separation device 110, close the separation device 110, and the like, as the labeling system 1200 would otherwise do to the groups 200, 202 of product 204. The separation device 110 may then be fed through the labeling system 1200 similar to the groups 200, 202 of product 204 with the labeling system 1200 processing (e.g., opening, labeling, and/or closing) the groups 200, 202 of product 204, but skipping the processing of the separation device 110.

In the illustrated embodiment, the sensing assembly 1400 is communicatively coupled (e.g., by one or more wired and/or wireless communication links) to a control unit 1402. The control unit 1402 may be the same control unit as the control unit 606 shown in FIG. 6 or may be a different control unit. The sensing assembly 1400 generates an output signal for communication to the control unit 1402 to notify the control unit 1402 when the separation device 110 is approaching the labeling system 1200. The control unit 1402 may be communicatively coupled with the labeling system 1200 so that the control unit 1402 can instruct or control the labeling system 1200 to process the groups 200, 202 of product 204, but not the separation device 110, as described above.

Figure 7:
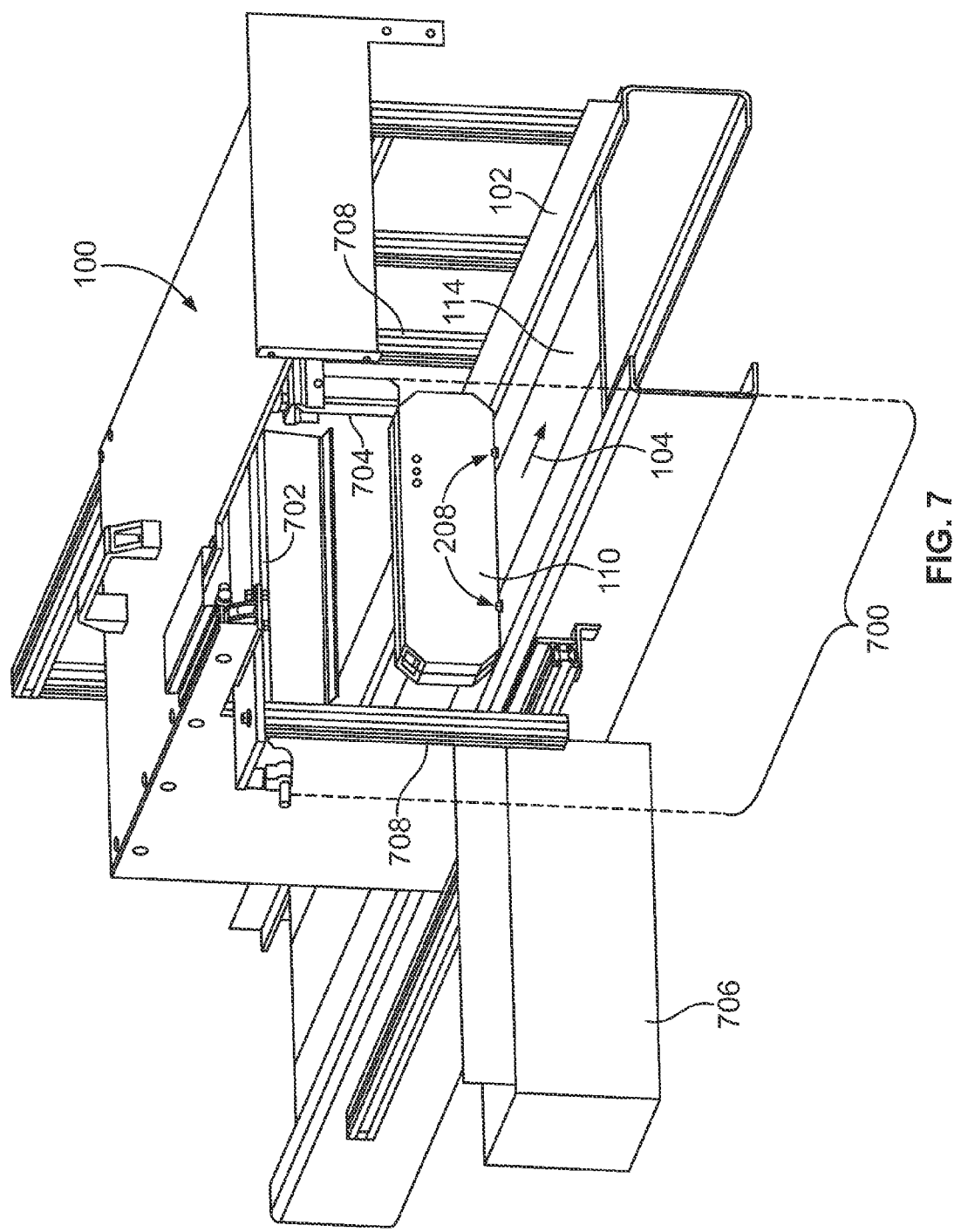
FIG. 7 is a perspective view of the separator system shown in FIG. 1 ejecting the separation device shown in FIG. 1 from the conveyance assembly shown in FIG. 1 in accordance with one embodiment.
Figure 8:
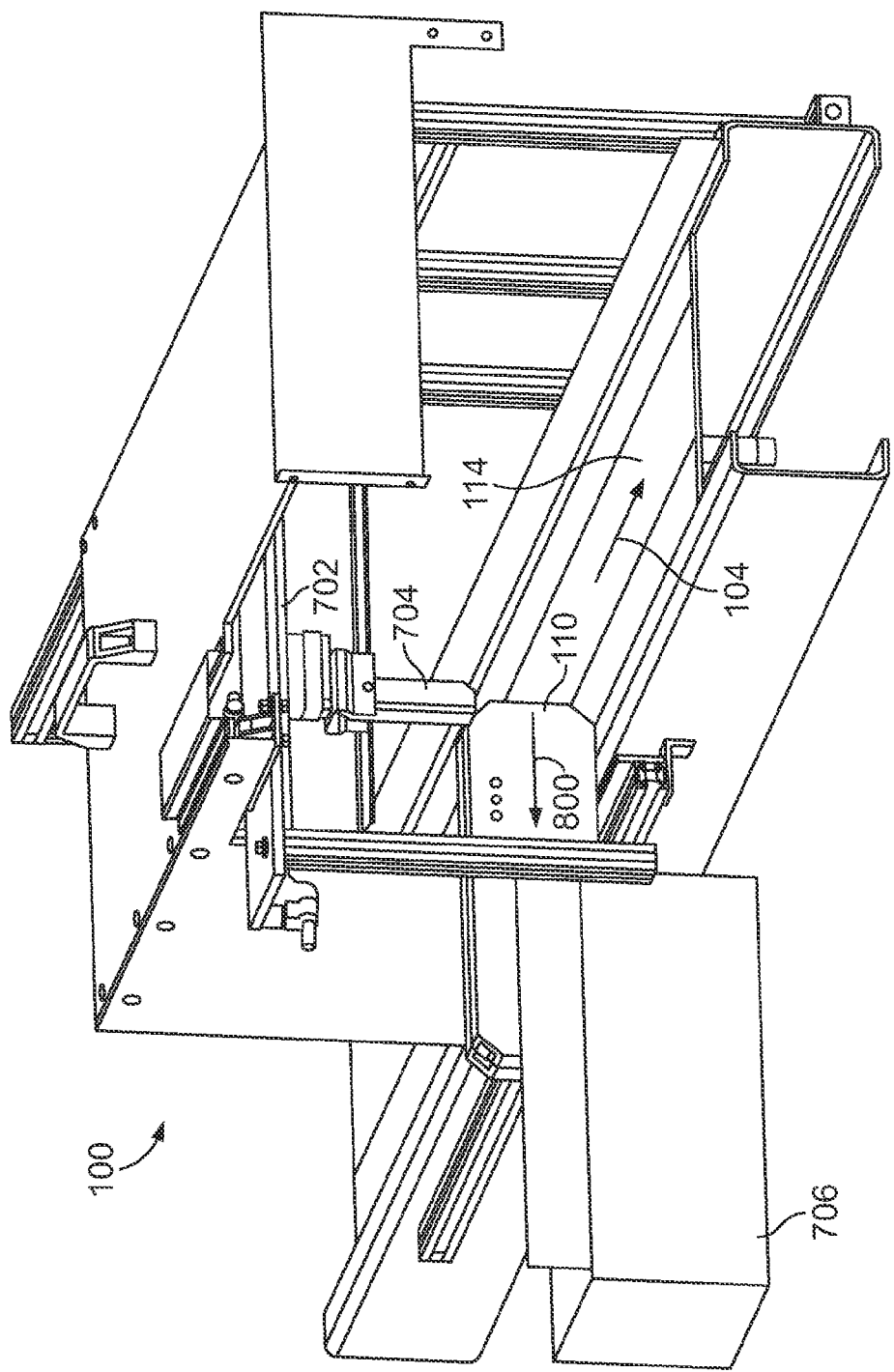
FIG. 8 is another perspective view of the separator system shown in FIG. 1 ejecting the separation device shown in FIG. 1 from the conveyance assembly shown in FIG. 1 in accordance with one embodiment.
Figure 9:
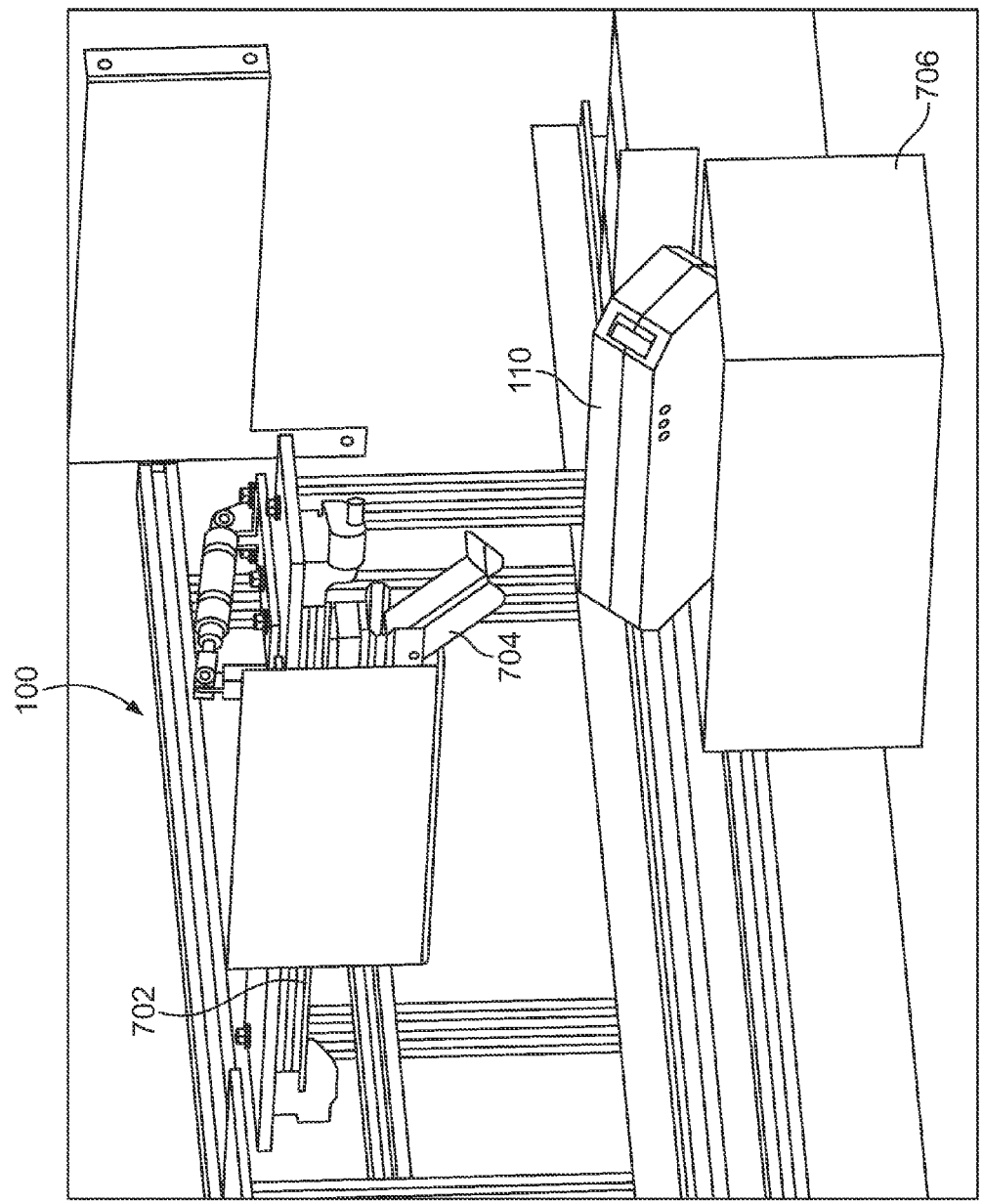
FIG. 9 is another perspective view of the separator system shown in FIG. 1 ejecting the separation device also shown in FIG. 1 from the conveyance assembly that also is shown in FIG. 1 in accordance with one embodiment.

FIGS. 7 through 9 are perspective views of the separator system 100 ejecting the separation device 110 from the conveyance assembly 102 in accordance with one embodiment. The separator system 100 includes an ejection assembly 700 that moves the separation device 110 from the conveyance assembly 102 and out of the way of the trailing group 200 (shown in FIG. 2) of product 204 (shown in FIG. 2) so that the trailing group 200 can continue to be moved toward the packaging system 206 (shown in FIG. 2), as described above. The ejection assembly 700 includes a guide 702 and an engagement arm 704 that moves along the guide 702. The guide 702 is disposed above and separated from the conveyance assembly 102 by risers 708 disposed on opposite sides of the conveyor 114 in the illustrated embodiment.

The guide 702 is an elongated body disposed transverse to the feed direction 104 and/or the direction of elongation of the conveyor 114 of the conveyance assembly 102. For example, the guide 702 may be elongated in a direction that is perpendicular to the feed direction 104 or is obliquely angled with respect to the feed direction 104. The engagement arm 704 is coupled with the guide 702 and can move along the length of the guide 702 such that the engagement arm 704 laterally moves over the conveyance assembly 102, as shown in FIGS. 7 through 11. For example, the guide 702 may include a rod, channel, or other body that the engagement arm 704 is slidably coupled with such that the engagement arm 704 can move back and forth along the length of the guide 702.

In FIG. 7, prior to ejecting the separation device 110, the engagement arm 704 is oriented downward (e.g., toward the conveyance assembly 102). When the separation device 110 is to be removed from the conveyance assembly 102, the engagement arm 704 moves along the length of the guide 702. For example, the engagement arm 704 may laterally move from the position shown in FIG. 7 across the feed direction 104 and conveyor 114. As the engagement arm 704 laterally moves, the engagement an 704 contacts the separation device 110 and laterally pushes the separation device 110, as shown in FIG. 8. The engagement between the arm 704 and the separation device 110 and the lateral movement of the engagement arm 704 moves the separation device 110 in a lateral direction 800 (shown in FIG. 8).

The engagement arm 704 may continue to move the separation device 110 in the lateral direction 800 until the separation device 110 is removed from the conveyance assembly 102. For example, the engagement arm 704 can push the separation device 110 off of the surface 112 of the conveyance assembly 102 and into a holding tray 706, as shown in FIG. 9. The holding tray 706 is a receptacle that can hold one or more of the separation devices 110 that are ejected for later use. Once the separation device 110 is ejected from the conveyance assembly 102, the trailing group 200 (shown in FIG. 2) of product 204 (shown in FIG. 2) can continue to be moved by the conveyance assembly 102 toward the packaging system 206 (shown in FIG. 2), as described above.

In another embodiment, instead of laterally pushing the separation device 110 off of the conveyance assembly 102, the ejection assembly 700 may otherwise move the separation device 110 out of the direction of travel of the trailing group 200 of product 204 along the conveyance assembly 102. For example, the ejection assembly 700 may lift the separation device 110 so that the trailing group 200 can continue moving toward the packaging system 206.

Figure 10:
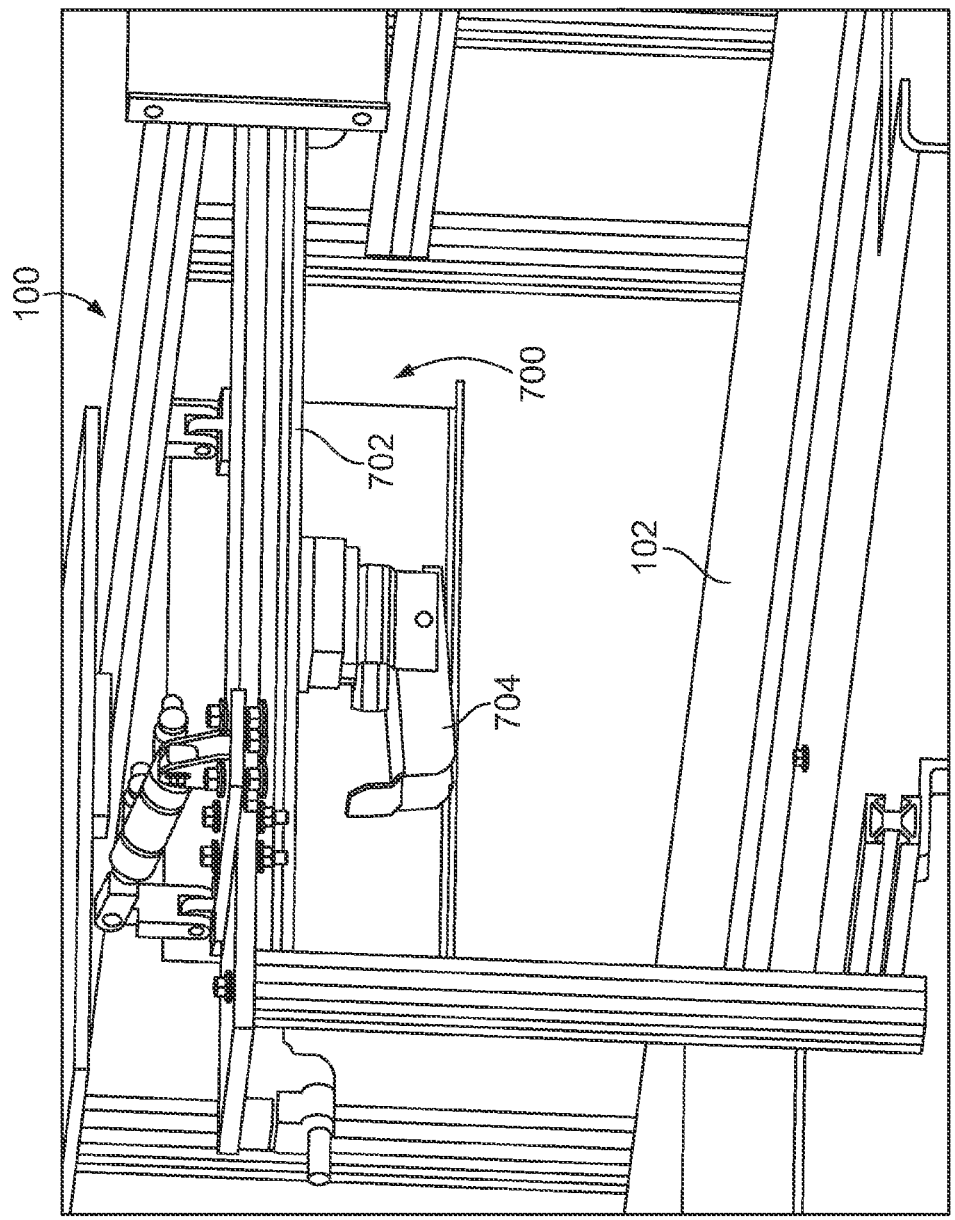
FIG. 10 is a perspective view of one embodiment of an ejection assembly shown in FIG. 7 returning to a starting position.
Figure 11:
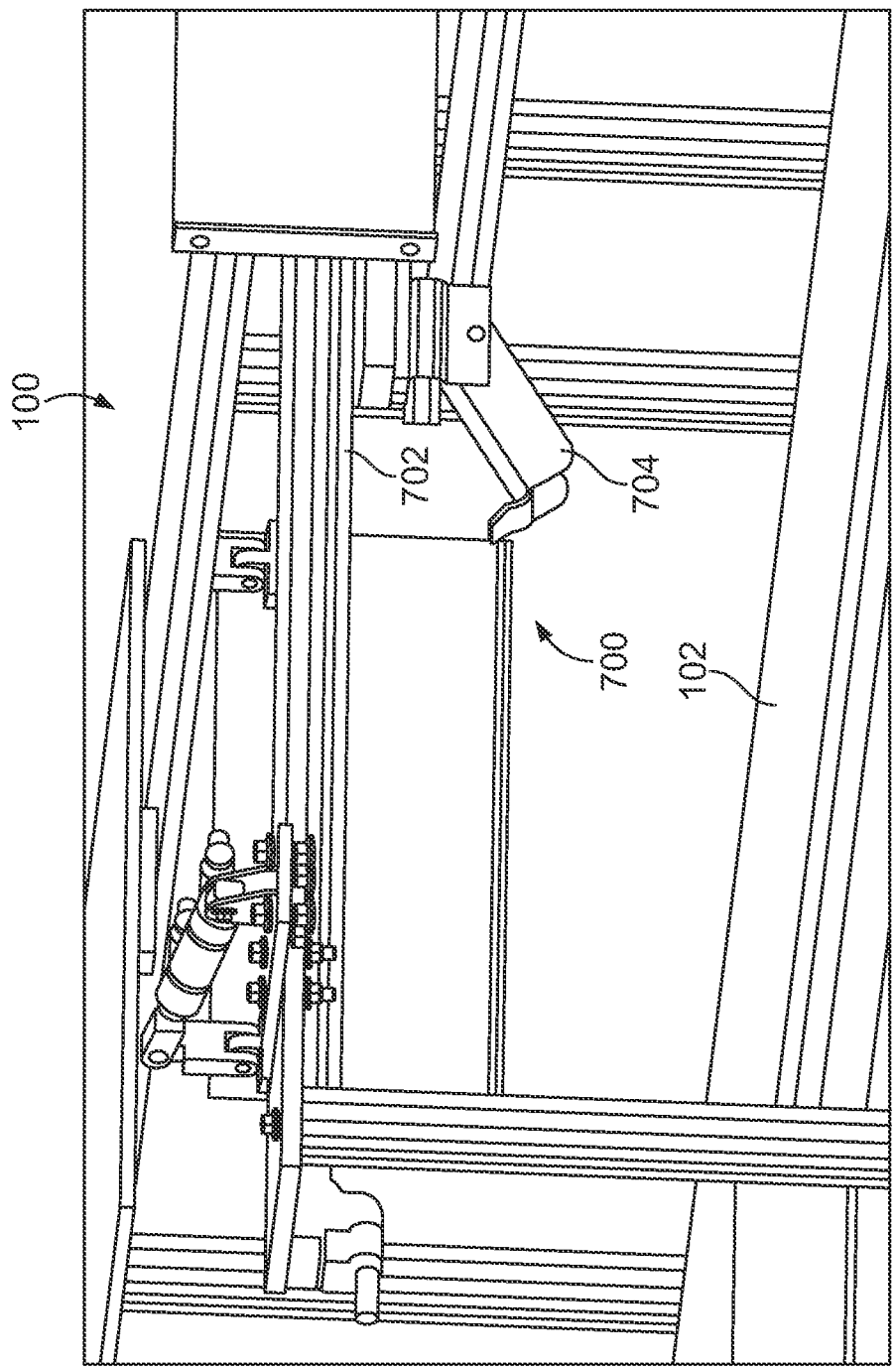
FIG. 11 is another perspective view of one embodiment of the ejection assembly shown in FIG. 7 returning to the starting position.

FIGS. 10 and 11 are perspective views of one embodiment of the ejection assembly 700 returning to a starting position. The ejection assembly 700 can return to the position shown in FIG. 7 after ejecting the separation device 110 (shown in FIG. 1) from the conveyance assembly 102. The engagement arm 704 may rotate toward the guide 702 in order to provide additional clearance between the ejection assembly 700 and the conveyance assembly 102. This additional clearance may be used to prevent the engagement arm 704 from coming into contact with the product 204 (shown in FIG. 2) as the product 204 moves between the guide 702 and the conveyance assembly 102, Alternatively, the engagement arm 704 may be disposed sufficiently far from the conveyance assembly 102 and the product 204 that the engagement arm 704 does not need to move away from the conveyance assembly 102 and product 204 to avoid contact with the product 204. The engagement arm 704 then moves along the guide 702 to the position shown in FIG. 7. If the engagement arm 704 rotated or moved toward the guide 702, the engagement arm 704 may rotate or move away from the guide 702 to prepare for ejecting another separation device 110 from the conveyance assembly 102, as shown in FIG. 11.

Figure 12:
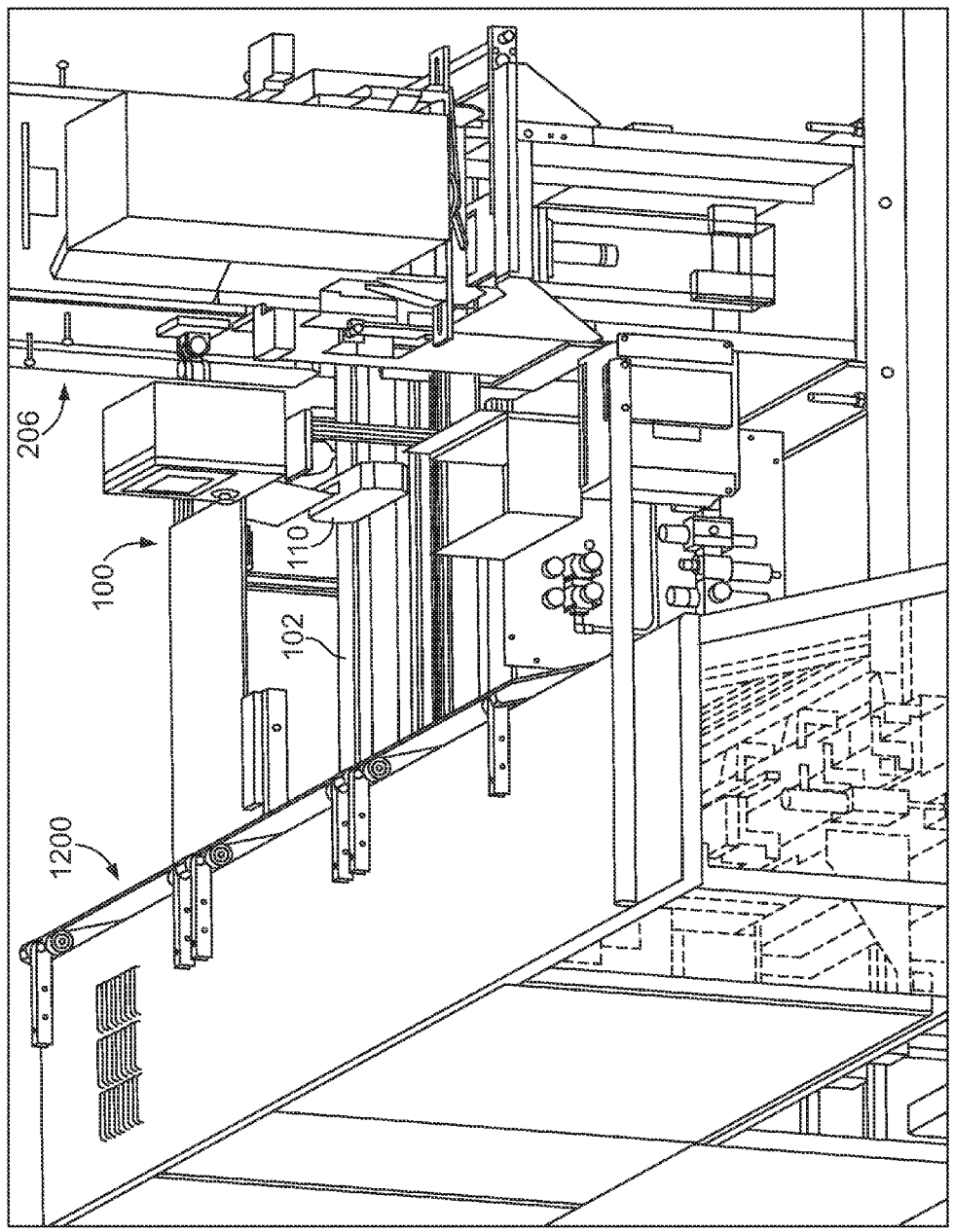
FIG. 12 is a perspective view of one embodiment of the separator system shown in FIG. 1 coupled with a feeding system and a packaging system shown in FIG. 2.

FIG. 12 is a perspective view of one embodiment of the separator system 100 coupled with a labeling system 1200 and the packaging system 206. The separator system 100 is disposed between the labeling system 1200, which applies the stamps, labels, or other indicia on the product 204 (shown in FIG. 2), and the packaging system 206, which packages the product 204 into one or more containers, as described above After labeling, an operator may place the separation device 110 between the different groups 200, 202. Alternatively; the separation device 110 may autonomously be placed between the different groups 200, 202. The separation device 110 may be placed between the groups 200, .202 in order to separate product 204 that is different from each other, such as by being provided by different manufacturers or producers, being different brand named products, being different products that are to receive different labels from the labeling system 206, and the like.

The separator system 100 allows the leading group 202 (shown in FIG. 2) of product 204 (shown in FIG. 2) to proceed along the conveyance assembly 102 to the packaging system 206 while the trailing group 200 (shown in FIG. 2) of product 204 is held in place, as described above. Once the packaging system 206 has purged the leading group 202, the separator system 100 removes the separation device 110 to allow the trailing group 200 of product 204 to proceed to the packaging system 206, also as described above.

Figure 13:
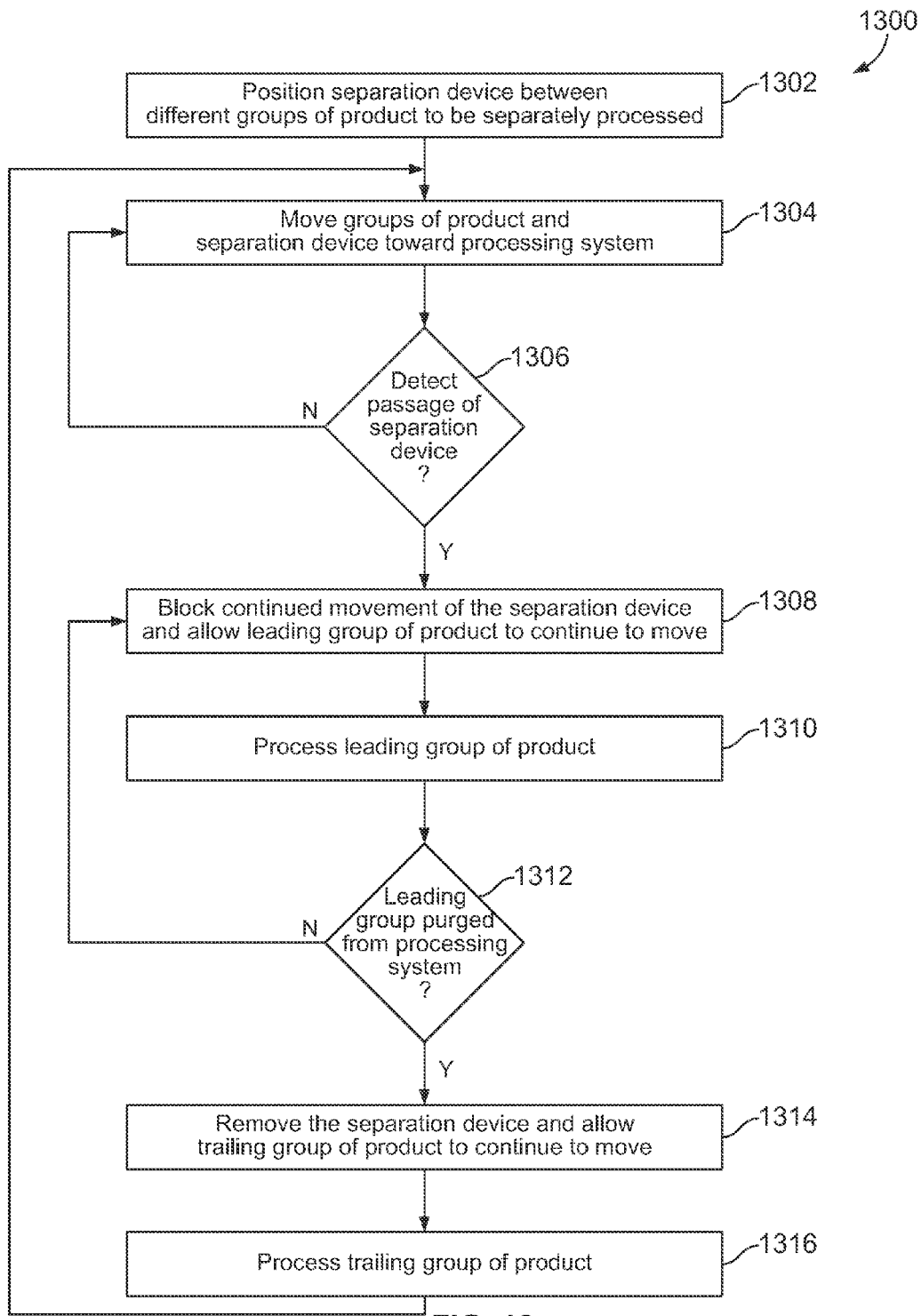
FIG. 13 is a flowchart of a method for separating groups of products to be packaged in accordance with one embodiment.

FIG. 13 is a flowchart of a method 1300 for separating groups of products to be separately processed in accordance with one embodiment. The method 1300 may be used in conjunction with one or more embodiments of the separator system 100 (shown in FIG. 1), the packaging system 206 (shown in FIG. 2), and/or the conveyance assembly 102 (shown in FIG. 1) described above. For example, the method 1300 may be used to separate different groups of product that are to be separately packaged after being labeled.

At 1302, a separation device is disposed between different groups of product. For example, the separation device 110 (shown in FIG. 1) may be placed between the leading group 202 (shown in FIG. 2) of product 204 (shown in FIG. 2) and the trailing group 200 (shown in FIG. 2) of product 204. The separation device 110 may be manually or automatically placed between the groups 200, 202.

At 1304, the groups of product and the separation device are moved toward a processing system. For example, the groups 200, 202 (shown in FIG. 2) and the separation device 110 (shown in FIG. 1) are moved by the conveyance assembly 102 (shown in FIG. 1) toward the packaging system 206 (shown in FIG. 2) for packaging.

At 1306, a determination is made as to whether the separation device has passed or is approaching blocking components of the conveyance assembly. For example, the sensing assembly 600 (shown in FIG. 6) may determine if the separation device 110 (shown in FIG. 1) is approaching the blocking components 208 (shown in FIG. 2). If the separation device 110 is approaching the blocking components 208, then the separation device 110 may need to be blocked from continued movement to allow the leading group 202 (shown in FIG. 2) of product 204 (shown in FIG. 2) to be packaged by the packaging system 206 (shown in FIG. 2) before allowing the trailing group 200 (shown in FIG. 2) to continue moving toward the packaging system 206. As a result, flow of the method 1300 may proceed to 1308. Alternatively, if the separation device 110 is not yet approaching the blocking components 208, then the separation device 110 may not need to be blocked from continued movement and the groups 200, 202 and the separation device 110 can be allowed to continue moving toward the packaging system 206. As a result, flow of the method 1300 may return to 1304 to continue moving the groups 200, 202 and the separation device 110.

At 1308, continued movement of the separation device is blocked in order to allow the leading group of product to continue toward the processing system. For example, the blocking components 208 (shown in FIG. 2) may engage the separation device 110 (shown in FIG. 1) to stop movement of the separation device 110 and the trailing group 200 (shown in FIG. 2) of product 204 (shown in FIG. 2), while allowing the leading group 202 (shown in FIG. 2) to continue moving toward the packaging system 206 (shown in FIG. 2).

At 1310, the product in the leading group is processed by the processing system. For example, the packaging system 206 (shown in FIG. 2) may package the product 204 (shown in FIG. 2) of the leading group 202 (shown in FIG. 2) into one or more containers for shipping or sale, while the trailing group 200 (shown in FIG. 2) is held back from the packaging system 206 by the separation device 110 (shown in FIG. 1).

At 1312, a determination is made as to whether the leading group of product has been purged from the processing system. For example, a determination may be made as to whether the packaging system 206 (shown in FIG. 2) has completed packaging of the product 204 (shown in FIG. 2) in the leading group 202 (shown in FIG. 2) and the leading group 202 of product 204 has been removed from the packaging system 206. If the leading group 202 has been purged from the packaging system 206, then the trailing group 200 (shown in FIG. 2) of product 204 may now be allowed to move into and be packaged by the packaging system 206. As a result, flow of the method 1300 may proceed to 1314. Alternatively, if the leading group 202 has not been purged from the packaging system 206 (e.g., the leading group 202 is still being packaged or has not yet been cleared or removed from the packaging system 206), then the trailing group 200 of product 204 may not yet be allowed to move into and be packaged by the packaging system 206. As a result, flow of the method 1300 may return to 1308, where the separation device 110 (shown in FIG. 1) continues to block movement of the trailing group 200 of product 204 toward the packaging system 206.

At 1314, the separation device is removed to allow the trailing group of product to move toward the processing system. For example, the separation device 110 (shown in FIG. 1) may be ejected from the direction of travel of the trailing group 200 (shown in FIG. 2) of product 204 (shown in FIG. 2) along the feed direction 104 (shown in FIG. 1). Once the separation device 110 is ejected, the trailing group 200 can return to moving toward the packaging system 206 (shown in FIG. 2).

At 1316, the trailing group of product is processed by the processing system. For example, the trailing group 200 (shown in FIG. 2) of product 204 (shown in FIG. 2) may enter into and be packaged by the packaging system 206 (shown in FIG. 2). In one embodiment, flow of the method 1300 may return to 1304 where there are additional trailing groups of product and additional separation devices separating the groups from each other, as described above.

While the discussion herein focuses on the separation of different groups of product for separate packaging, alternatively, the groups may be separated for other types of processing. For example, the different groups may be separated from each other for separate labeling, separate quality control or examination, separate types of processing of the product, and the like. For example, the packaging system 206 (shown in FIG. 2) alternatively may be a processing system that separately performs processing other than packaging on the different groups of product.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While relative dimensions described herein are intended to define the parameters of the inventive subject matter, they are by no means limiting and are example embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

What is claimed is:

1. A separator system comprising:
    a conveyor configured to move a leading group of product and a trailing group of product along a feed direction toward a packaging system to separately package the leading group of product into a first container and the trailing group of product into a second container;
    blocking bodies disposed upstream of the packaging system along the feed direction and on opposite sides of the conveyor, the blocking bodies configured to stop movement of the trailing group of product upstream of the packaging system along the feed direction while allowing the leading group of product to move toward the packaging system;
    a separation body configured to be disposed between the leading group of product and the trailing group of product, the separation body also configured to move along the feed direction between the leading group of product and the trailing group of product, wherein the blocking bodies are configured to stop movement of the separation body to also stop movement of the trailing group of product upstream of the packaging system along the feed direction while allowing the leading group of product to continue moving toward the packaging system; and
    an ejection assembly configured to remove the separation body from the conveyor to allow the trailing group of product to move toward the packaging system at a time that will allow the leading group of product to be purged from the packaging system before the trailing group of product is packaged in the packaging system.

2. The separator system of claim 1, wherein the conveyor is configured to continue moving the trailing group of product toward the packaging system after the ejection assembly removes the separation body from the conveyance assembly.

3. The separator system of claim 1, wherein the ejection assembly includes an elongated guide disposed transverse to the feed direction and an engagement arm configured to move along the guide, the engagement arm is also configured to engage the separation body and move along the guide to push the separation body off of the conveyor.

4. The separator system of claim 1, wherein the blocking bodies are configured to engage a leading side of the separation body that abuts the leading group of product.

5. The separator system of claim 1, wherein the blocking bodies of the conveyor are configured to extend upward to engage stop continued movement of the trailing group of product.

6. The separator system of claim 1, further comprising:
    a sensor configured to detect passage of at least one of the leading group of product, the separation body, or the trailing group of product toward the blocking bodies and to generate an output signal based on the passage of the at least one of the leading group of produce, the separation body, or the trailing group of product; and
    a control unit configured to actuate the blocking bodies to engage at least one of the separation body or the trailing group of product when the output signal is generated by the sensor.

7. The separator system of claim 1, wherein the conveyor is configured to be disposed beneath the leading group of product and the trailing group of product while moving toward the packaging system, the conveyor configured to continue moving beneath the trailing group of product while the leading group of product moves toward the packaging system and the movement of the trailing group of product toward the packaging system is stopped.

8. The separator system of claim 1, wherein the blocking bodies include elongated pins.

9. A method for separating groups of product to be separately packaged from each other, the method comprising:
    positioning a separation body between a leading group of product and a trailing group of product;
    moving the leading group of product and the trailing group of product along a feed direction toward a packaging system;
    blocking movement of the trailing group of product upstream of the packaging system along the feed direction to prevent continued movement of the trailing group of product toward the packaging system while the leading group of product continues to move toward the packaging system, wherein blocking the movement of the trailing group of product includes blocking movement of the separation body to stop the movement of the trailing group of product; and
    permitting the trailing group of product to return to moving toward the packaging system after the leading group of product is received in the packaging system, wherein permitting the trailing group of product to return to moving toward the packaging system includes removing the separation body from a direction of travel of the trailing group of product along the feed direction.

10. The method of claim 9, wherein permitting the trailing group of product to return to moving toward the packaging system occurs when the leading group of product is purged from the packaging system.

11. The method of claim 9, wherein removing the separation body includes laterally pushing the separation body across the feed direction and out of the direction of travel of the trailing group of product.

12. The method of claim 9, wherein blocking the movement of the separation body includes engaging the separation body with one or more blocking bodies disposed upstream of the packaging system after the leading group of product has passed the one or more blocking bodies along the feed direction.

13. The method of claim 9, further comprising:
  detecting passage of at least one of the leading group of product, the separation body, or the trailing group of product toward one or more blocking bodies that engage at least one of the separation body or the trailing group of product to block the movement of at least one of the separation body or the trailing group of product toward the packaging system; and
  actuating the one or more blocking bodies to engage with at least one of the separation body or the trailing group of product when the passage of at least one of the leading group of product, the separation body, or the trailing group of product is detected.

14. The method of claim 9, wherein moving the leading group of product and the trailing group of product includes moving a conveyor beneath the leading group of product and the trailing group of product, wherein during blocking the movement of the trailing group of product, the conveyor continues to move beneath the trailing group of product.

15. A separator system comprising:
  blocking bodies configured to be disposed on opposite sides of a conveyor that moves a leading group of product and a trailing group of product toward a processing system in order to be separately processed; and
  a sensor configured to sense passage of at least one of the leading group of product or the trailing group of product toward the blocking bodies, the sensor further configured to direct the blocking bodies to block continued movement of the trailing group of product toward the processing system while the leading group of product continues to move toward the processing system by the conveyor.

16. The separator system of claim 15, further comprising a separation body configured to be disposed between the leading group of product and the trailing group of product, wherein the blocking bodies are configured to engage the separation body to block the continued movement of the trailing group of product toward the processing system.

17. The separator system of claim 16, further comprising an ejection assembly configured to remove the separation body from a direction of travel of the trailing group of product toward the processing system when the leading group of product is purged from the processing system.

18. The separator system of claim 17, wherein the ejection assembly includes a guide and an engagement arm, the guide disposed transverse to a feed direction that the conveyor moves the leading group of product, the separation body, and the trailing group of product toward the processing system, the engagement arm configured to move along the guide to laterally push the separation body off of the conveyor.

19. The separator system of claim 17, wherein the ejection assembly is configured to laterally push the separation body off of the conveyor.

20. The separator system of claim 16, wherein the blocking bodies are configured to extend upward above the conveyor to engage the separation body.

21. The separator system of claim 15, wherein the blocking bodies include elongated pins.

22. A separator system comprising:
  a conveyor configured to move a leading group of product and a trailing group of product along a feed direction toward a packaging system to separately package the leading group of product into a first container and the trailing group of product into a second container;
  blocking bodies disposed upstream of the packaging system along the feed direction and on opposite sides of the conveyor;
  a separation body configured to be disposed between the leading group of product and the trailing group of product, the separation body also configured to move along the feed direction between the leading group of product and the trailing group of product, wherein the blocking bodies are configured to stop movement of the separation body upstream of the packaging system along the feed direction to allow the leading group of product to move toward the packaging system while the separation body prevents continued movement of the trailing group of product toward the packaging system; and
  an ejection assembly configured to remove the separation body from the conveyor by laterally pushing the separation body off of the conveyor to allow the trailing group of product to move toward the packaging system after the leading group of product travels toward the packaging system.

23. The separator system of claim 22, wherein the blocking bodies include elongated pins.

* * * * *